United States Patent
Kiser

[15] 3,689,025
[45] Sept. 5, 1972

[54] AIR LOADED VALVE

[72] Inventor: Elmer P. Kiser, P.O. Box 883, 1531 Main St., Napa, Calif. 94558

[22] Filed: July 30, 1970

[21] Appl. No.: 59,617

[52] U.S. Cl..............251/25, 251/61.4, 137/DIG. 7
[51] Int. Cl................................................F16k 7/17
[58] Field of Search.......251/61.4, 61.1, 25, 61.2, 61; 137/629, DIG. 7

[56] References Cited

UNITED STATES PATENTS

| | | | |
|---|---|---|---|
| 3,502,297 | 3/1970 | Wardrop | 251/61.1 X |
| 2,577,967 | 12/1951 | Hughes | 251/25 |
| 3,175,473 | 3/1965 | Boteler et al. | 251/61 X |
| 1,849,475 | 3/1932 | Bottoms | 137/DIG. 7 |
| 2,305,211 | 12/1942 | Walton | 137/DIG. 7 |
| 542,733 | 7/1895 | Johnson | 251/28 |
| 2,675,204 | 4/1954 | Johnson | 251/25 |

FOREIGN PATENTS OR APPLICATIONS 899,236    6/1962    Great Britain............251/61.1

*Primary Examiner*—Arnold Rosenthal
*Attorney*—George B. White

[57] ABSTRACT

In a casing is a cell filled with predetermined air pressure constantly, one wall of the cell is a rubber diaphragm which is pressed by the air pressure in the cell against a valve stem, the valve on which bears against a second diaphragm for closing the opening of the valve seat of a conduit. The space between the rubber diaphragms is divided by a separator disk. A regulator valve controls the introduction of air pressure to the chamber between the separator disk and the first diaphragm so that when the pressure is increased so as to balance and overcome the action of the constant air pressure above the diaphragm, the water pressure lifts the valve. When the air pressure between the disk and the first diaphragm is again reduced, the constant pressure above the first diaphragm closes the valve.

1 Claim, 4 Drawing Figures

INVENTOR.
ELMER P. KISER
BY
George B. White
ATTORNEY

INVENTOR.
ELMER P. KISER
BY George S. White
ATTORNEY

3,689,025

AIR LOADED VALVE

BACKGROUND OF THE INVENTION

Diaphragm valves are well known in the prior art, as well as spring loaded diaphragm valves. In the past certain attempts have been made to control a valve by opposed springs initially balanced and then opening the valves by upsetting the balance on one side of the diaphragm by changing pressure.

A feature of the present invention is to avoid the disadvantages of spring balanced valves both structurally and operationally, by providing a constant air pressure to hold the valve closed, and then permit the opening of the valve by balancing the initial constant pressure through an air chamber, thereby to accomplish a smooth and easy operation with instant opening and closing, particularly facilitating the manipulation of valves on water trucks or the like wherein several nozzles of various strength of flow must be controlled quickly and efficiently.

DETAILED DESCRIPTION

Figure 2:
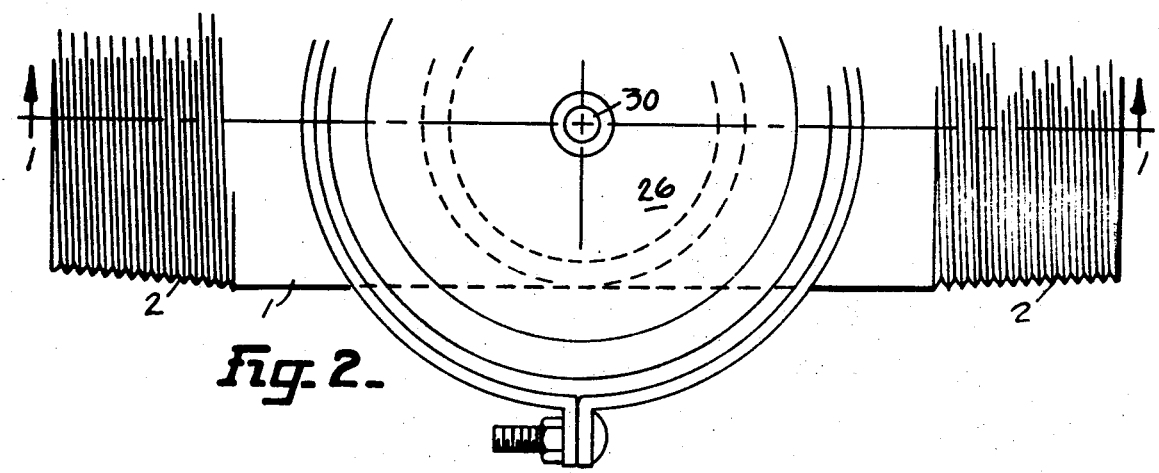
FIG. 2 is a fragmental top plan view of the valve.

The valve includes the usual valve body 1 with suitable threads 2 at its opposite ends for connection into a conduit, and a valve seat 3 separating one side of the valve body 1 from the other. The usual flow is from the inlet side 4 to the outlet side 5 of the valve body.

Figure 1:
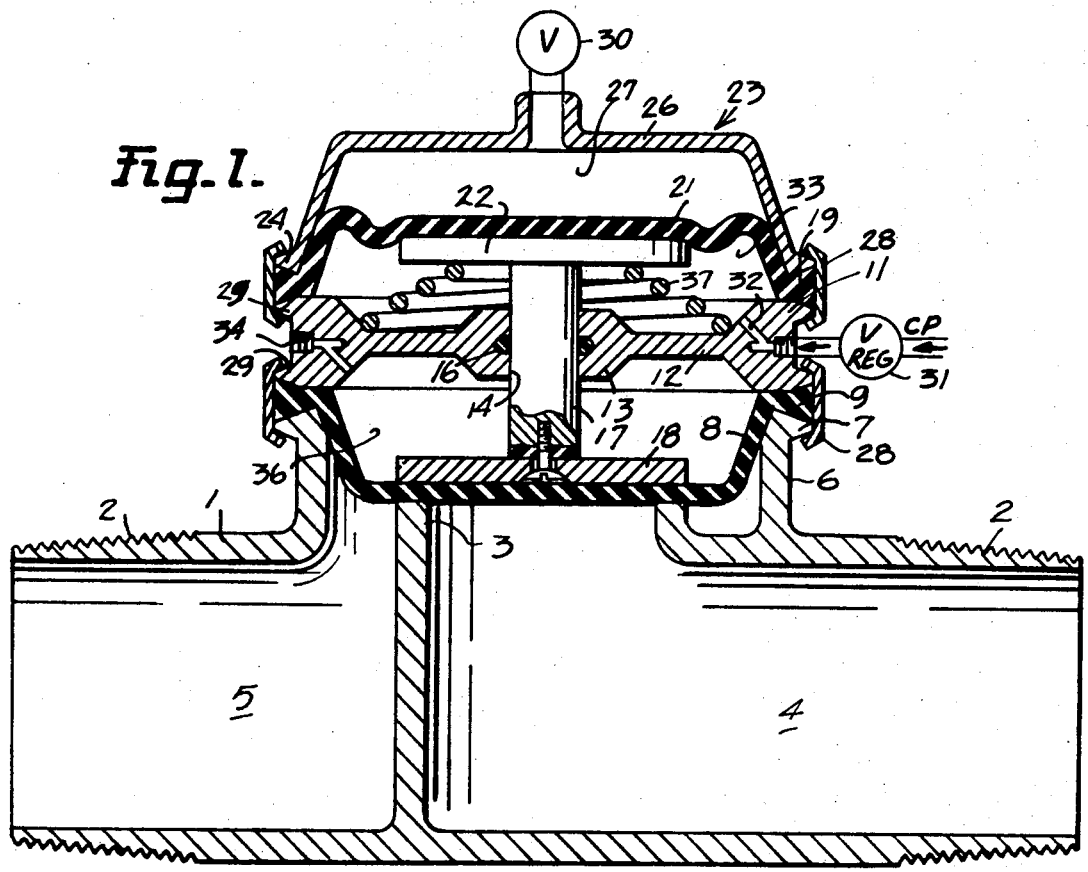
FIG. 1 is a sectional view of the double diaphragm valve.
Figure 3:
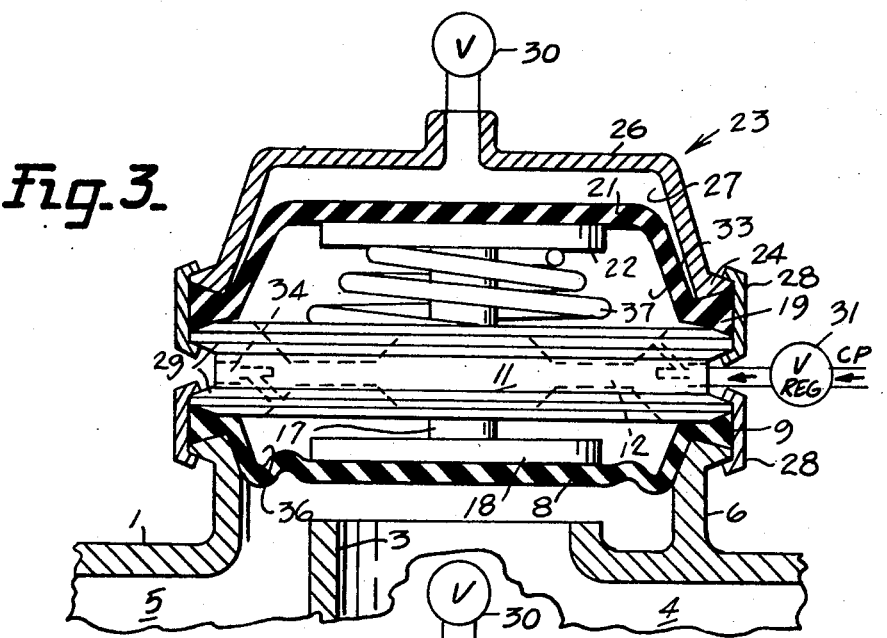
FIG. 3 is a fragmental cross-sectional view of the valve in open position.

A cylindrical boss 6 extends from the valve body and surrounds the valve seat 3 in suitable spaced relation to permit flow from the intake side 4 to the outlet side 5 when the valve seat 3 is uncovered. On the top of the cylindrical boss 6 is an outwardly tapered flange 7. On the flange 7 on the top of the cylindrical boss 6 is positioned a valve diaphragm 8 which is dished from the flange 7 downwardly so it may be stretched from the position shown in FIG. 3 into the position shown in FIG. 1 for sealing the valve seat 3. On the valve diaphragm flange 9 is seated the enlarged rim 11 of a separator disk 12. In the hub 13 of the disk 12 is a hole 14 sealed by a suitable O ring 16 to slideably guide a valve stem 17 of a flat valve head 18. The flat valve head 18 is in contact with the adjacent surface of the dished portion of the valve diaphragm 8.

On the enlarged rim 11 of the disk 12 is positioned the flange 19 of a control diaphragm 21 which is dished upwardly from its flange 19 substantially symmetrically to the dished valve diaphragm 8. A flat disk 22 on the upper end of the valve stem 17 is in contact with the adjacent lower surface of the dished portion of the control diaphragm 21. A hollow housing 23 has an outwardly tapered flange 24 seated on the flange 19 of the control diaphragm so that the bottom 26 of the housing 23 is spaced from the control diaphragm 21 and forms a chamber 27.

The aforesaid superimposed elements are held together by suitable annular clamps 28. The enlarged rim 11 of the disk 12 has also outwardly tapering flanges 29, and the respective clamps 28 are clamped over the flanges 29 and respectively the flange 7 of the boss 6 and the flange 24 of the housing 23. A single flange between the flange 7 of the boss 6 and the flange 24 of the housing 23 may be also utilized for clamping the superimposed structural elements to one another and to the boss 6.

The housing 23 has a pneumatic valve preferably of the usual tire valve type for filling the chamber 27 with a predetermined air pressure needed to overcome the water pressure on the intake side 4 of the valve body 1. This valve 30 is normally closed and is opened only for the introduction of air under pressure into the chamber 27. In one side of the rim 11 of the disk 12 is a control or regulating valve 31 which communicates through the passage 32 with a chamber 33 between the disk 12 and the control diaphragm 21.

A suitable vent 34 is provided through the rim 11 of the disk 12 from the space or chamber 36 between the disk 12 and the valve diaphragm 8. A coil spring 37 may be provided between the disk 12 and the flat disk 22 on the top of the valve stem 17 to provide further resiliency.

Both diaphragms 8 and 21 are resiliently yieldable and due to their dished form they can be collapsed or expanded during the operations. However, the operation is not dependent upon the resiliency of the diaphragms nor upon the resiliency of the spring 37. The constant pressure permanently loaded into the housing chamber 27 is predetermined to be sufficient to exert pressure through the flat disk 22, valve stem 17 and valve head 18 on the valve diaphragm 8 to cover and close the valve seat 3 under a given liquid pressure on the intake side 4 of the valve body 1. In order to open the valve the operator connects the regulator or control valve 31 to a source of air pressure and simply opens this valve 31 to admit pressure to overbalance the initial holding pressure in chamber 27, whereupon the liquid pressure from the intake side 4 of the valve body 1 lifts the lower diaphragm 8 and the flat valve head 18, and through the valve stem 17 raises the flat disk 22 and the control diaphragm 21 from the position shown in FIG. 1 to the position shown in FIG. 3. By another turn of the valve 31, after the desired amount of liquid flow is dispensed, the pressure in chamber 33 below the control diaphragm 21 is relieved and the initial constant pressure is again sufficient to return the diaphragms from the position shown in FIG. 3 into the position shown in FIG. 1 and thereby close the valve.

Figure 4:
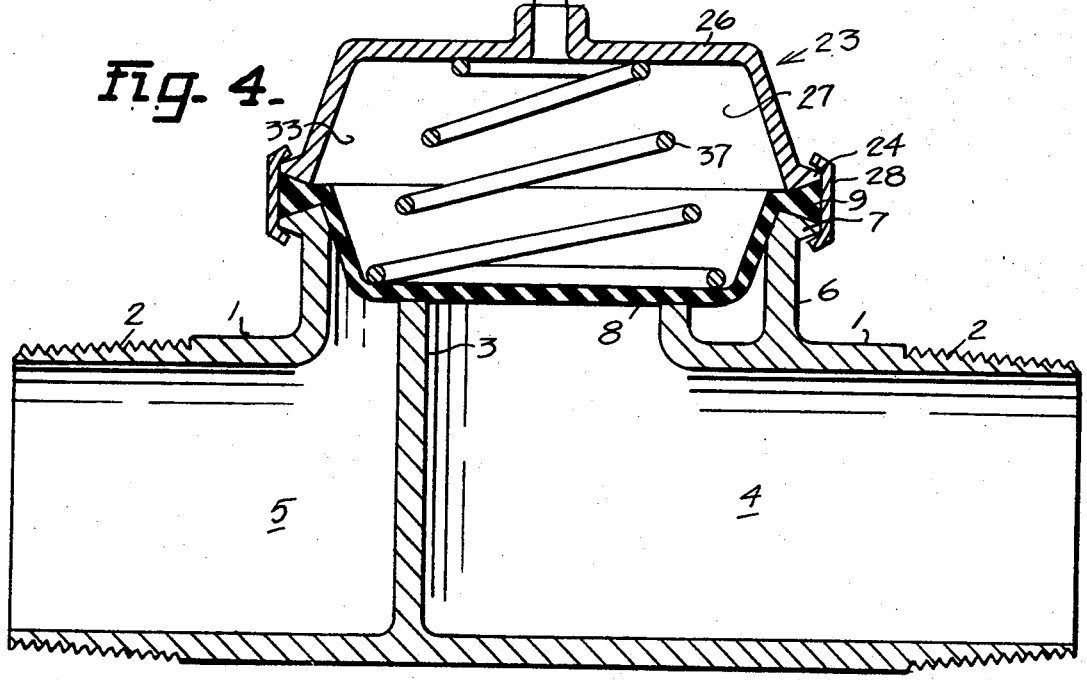
FIG. 4 is a cross-sectional view of the valve converted into a single diaphragm valve.

Another advantage of the herein valve is that in the event that one of the diaphragms is for some reason rendered inoperative, the valve can be quickly converted into a single diaphragm valve as shown in FIG. 4. Namely, assuming that the control diaphragm 21 breaks or is incapacitated, then the clamps 28 are removed and the housing 23 is directly placed on the lower diaphragm 8 and clamped in place by the clamp 28. In this form the valve 30 becomes the regulator or control valve for closing and opening.

I claim:

1. A valve including
    a valve body having an intake and exhaust side separated by a valve seat on the intake side,
    a support flange extended from the valve body and spaced from and surrounding said valve seat, an enlarged head on said support flange, a valve diaphragm for covering said valve seat, a flange on the outer periphery of the valve diaphragm fitting over said enlarged head, a housing above and spaced from said diaphragm, a flange on the housing fitting over said diaphragm flange, detachable means to clamp said enlarged head and said housing flange together and against said diaphragm flange, an actuating diaphragm, a rigid divider interposed between said valve diaphragm and said actuating diaphragm, said rigid divider having a flange bearing against said diaphragm flange and having another flange bearing against the outer periphery of said actuating diaphragm, said housing flange bearing against the outer periphery of said actuating diaphragm, detachable means to secure said housing to the adjacent flange of said divider, the space in said housing above said actuating diaphragm being pre-loaded by air pressure exceeding the pressure from the intake side of said valve, reciprocating means extended through said divider to transmit pressure from said actuating diaphragm to said valve diaphragm thereby to hold said valve diaphragm on said valve seat, valve controlled means extended from the outside through said divider and into the space between said divider and said actuating diaphragm for admitting air at will to balance the pressure on the opposite sides of said actuating diaphragm, thereby to permit the liquid pressure from the intake side of the valve to move said valve diaphragm away from said valve seat, and vent means for the excape of air from between the valve diaphragm and said divider.

* * * * *